(12) United States Patent
Parrish

(10) Patent No.: US 6,631,483 B1
(45) Date of Patent: Oct. 7, 2003

(54) CLOCK SYNCHRONIZATION AND FAULT PROTECTION FOR A TELECOMMUNICATIONS DEVICE

(75) Inventor: Brent K. Parrish, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/330,433

(22) Filed: Jun. 8, 1999

(51) Int. Cl.⁷ .................................................. G06F 11/00
(52) U.S. Cl. ............................ 714/55; 714/43; 713/400; 713/500
(58) Field of Search .............................. 714/43, 51, 55, 714/56; 713/400, 500

(56) References Cited

U.S. PATENT DOCUMENTS

| | | | |
|---|---|---|---|
| 3,665,173 A | | 5/1972 | Bouricius et al. ............ 235/153 |
| 4,453,260 A | | 6/1984 | Inagawa et al. ............. 375/116 |
| 4,589,066 A | | 5/1986 | Lam et al. ................... 364/200 |
| 4,890,222 A | | 12/1989 | Kirk ............................ 364/200 |
| 5,059,925 A | | 10/1991 | Weisbloom ................. 331/1 A |
| 5,081,629 A | * | 1/1992 | Criswell et al. .............. 714/55 |
| 5,146,585 A | * | 9/1992 | Smith, III .................... 713/400 |
| 5,255,291 A | | 10/1993 | Holden et al. ............... 375/111 |
| 5,500,853 A | | 3/1996 | Engdahl et al. ................ 370/17 |
| 5,537,583 A | * | 7/1996 | Truong ........................ 713/500 |
| 5,742,649 A | | 4/1998 | Muntz et al. ................. 375/371 |
| 5,761,097 A | * | 6/1998 | Palermo ........................ 702/79 |
| 5,787,070 A | | 7/1998 | Gupta et al. ................. 370/217 |
| 5,812,618 A | | 9/1998 | Muntz et al. ................. 375/372 |
| 5,822,383 A | | 10/1998 | Muntz et al. ................. 375/362 |
| 5,848,265 A | * | 12/1998 | Maas et al. .................. 713/500 |
| 5,903,745 A | * | 5/1999 | Nakayama et al. .......... 713/500 |
| 5,923,613 A | * | 7/1999 | Tien et al. ................... 365/233 |
| 6,240,123 B1 | * | 5/2001 | Zhang et al. ................ 375/130 |
| 6,266,780 B1 | * | 7/2001 | Grundvig et al. ............ 713/501 |
| 6,338,144 B2 | * | 1/2002 | Doblar et al. ................ 713/400 |
| 6,339,833 B1 | * | 1/2002 | Guo .............................. 714/55 |
| 6,470,458 B1 | * | 10/2002 | Dreps ........................... 713/400 |

* cited by examiner

Primary Examiner—Robert Beausoliel
Assistant Examiner—Bryce P. Bonzo
(74) Attorney, Agent, or Firm—Baker Botts, L.L.P.

(57) ABSTRACT

A telecommunications device includes a synchronization bus and a controller coupled to the bus. The controller selects a primary reference clock signal from among a plurality of reference clock signals, generates a first system clock signal according to the primary reference clock signal, and communicates the system clock signal using the bus. The controller detects a loss of signal associated with the primary reference clock signal and, in response, enters holdover mode. The controller continues generating the first system clock signal while in holdover mode and determines the acceptability of a secondary reference clock signal also selected from among the plurality of reference clock signals. The controller performs a switchover from the primary reference clock signal to the secondary reference clock signal if the secondary reference clock signal is acceptable and, in response to the switchover, generates the first system clock signal according to the secondary reference clock signal. In one embodiment, a card coupled to the bus detects and indicates a loss of signal associated with the first system clock signal. A second controller determines a failure of the controller in response to at least the indication from the card. In a particular embodiment, the device is a switching unit having a high availability backplane environment.

55 Claims, 9 Drawing Sheets

CLOCK SYNCHRONIZATION AND FAULT PROTECTION FOR A TELECOMMUNICATIONS DEVICE

RELATED APPLICATIONS

This application is related to:

U.S. application Ser. No. 09/328,171 for a "LOCAL AREA NETWORK AND MESSAGE PACKET FOR A TELECOMMUNICATIONS DEVICE," filed Jun. 8, 1999 by Brent K. Parrish, Christopher A. Meltildi, John P. Barry, and Lee C. Stevens (062891.0284);

U.S. application Ser. No. 09//328,032 now U.S. Pat. No. 6,425,009 for a "HIGH AVAILABILITY LOCAL AREA NETWORK FOR A TELECOMMUNICATIONS DEVICE," filed Jun. 8, 1999 by Brent K. Parrish, Ronald A. McCracken, and John J. Fernald (062891.0287);

U.S. application Ser. No. 09/327,700 for a "TDM SWITCHING SYSTEM AND ASIC DEVICE," filed Jun. 8, 1999 by Brent K. Parrish and Werner E. Niebel (062891.0288);

U.S. application Ser. No. 09/327,971 for a "PROTECTION BUS AND METHOD FOR A TELECOMMUNICATIONS DEVICE," filed Jun. 8, 1999 by Brent K. Parrish and John P. Barry (062891.0306);

U.S. application Ser. No. 09/328,173 now U.S. Pat. No. 6,434,703 for a "EVENT INITIATION BUS AND ASSOCIATED FAULT PROTECTION FOR A TELECOMMUNICATIONS DEVICE," filed Jun. 8, 1999 by Brent K. Parrish, Ronald A. McCracken, and John J. Fernald (062891.0307);

U.S. application Ser. No. 09/328,031 for a "FRAME SYNCHRONIZATION AND FAULT PROTECTION FOR A TELECOMMUNICATIONS DEVICE," filed Jun. 8, 1999 by Brent K. Parrish (062891.0308); and U.S. application Ser. No. 09/328,172 for a "TRANSITIONING A STANDARDS-BASED CARD INTO A HIGH AVAILABILITY BACKPLANE ENVIRONMENT," filed Jun. 8, 1999 by Brent K. Parrish, Michael J. Taylor, and Michael P. Colton (062891.0309).

TECHNICAL FIELD OF THE INVENTION

This invention relates to the field of telecommunications, and more particularly to clock synchronization and fault protection for a telecommunications device.

BACKGROUND OF THE INVENTION

Many telecommunications devices include backplanes for transmitting digital information between components of the devices. For example, a telecommunications switching system might include a backplane for transmitting digital data representing voice signals between cards associated with incoming and outgoing ports. Typically, such a system would also include a mechanism to allow the system to detect a timing error, loss of clock synchronization, or other clock failure associated with the total or partial failure of one of the cards or of its clock generation functionality. Successful operation of the system in many instances will depend heavily upon the ability of this mechanism to detect and respond appropriately to such a failure to meet often stringent availability, flexibility, and other requirements placed on the system.

As the telecommunications industry continues to dominate the growth of the global economy, meeting availability, flexibility, and other requirements placed on switching and other systems has become increasingly important. High availability is generally considered as exceeding 99.999 percent availability, amounting to less than approximately five minutes of "down time" each year, and generally requires a system to be able to detect and to autonomously handle certain faults, such as a clock failure associated with a card or its clock generation functionality, without immediate human intervention. Providing high availability is often a de facto if not explicit competitive requirement for many telecommunications manufacturers.

However, prior techniques for detecting and responding to clock failures are often inadequate to meet high availability and other requirements. One such technique involves monitoring a reference clock signal and, in response to a loss of the reference clock signal, initiating a delayed or even a "hard" switchover to a redundant reference clock signal. Hard switchovers of this type often require significant time to accomplish and may result in "slips" in the network, lost calls, and other losses of data integrity. Even a delayed switchover may be of little use if the secondary reference clock signal has also been lost or is otherwise unsuitable. Prior techniques often do not allow the system to continue operating, uninterrupted and maintaining substantial data integrity, despite such clock failures. Moreover, although a system using such a technique might raise an alarm to indicate the clock failure, before or after initiating the switchover, the system might not be able to determine the source of the error—either the source of the reference clock signal or the card itself—which may lead to unnecessary switchovers and other undesirable consequences. These and other deficiencies are particularly apparent in high availability backplane environments of telecommunications devices.

SUMMARY OF THE INVENTION

According to the present invention, disadvantages and problems associated with clock synchronization and fault protection in telecommunications devices have been substantially reduced or eliminated.

According to one embodiment of the present invention, a telecommunications device includes a synchronization bus and a controller that is coupled to the bus. The controller selects a primary reference clock signal from among a plurality of reference clock signals, generates a first system clock signal according to the primary reference clock signal, and communicates the system clock signal using the bus. The controller detects a loss of signal associated with the primary reference clock signal and, in response, enters holdover mode. The controller continues generating the first system clock signal while in holdover mode and determines the acceptability of a secondary reference clock signal also selected from among the plurality of reference clock signals. The controller performs a switchover from the primary reference clock signal to the secondary reference clock signal, if the secondary reference clock signal is acceptable, and in response to the switchover generates the first system clock signal according to the secondary reference clock signal.

According to another embodiment, a first controller with a telecommunications device is coupled to a synchronization bus, generates a first system clock signal, and communicates the first system clock signal using the bus. A second controller coupled to the bus generates a second system clock signal and communicates the second system clock signal using the bus. A card coupled to the bus receives both the first and second system clock signals, synchronizes with at least the first system clock signal, detects a loss of signal associated with the first system clock signal, and indicates this loss of signal. The second controller determines a failure of the first controller in response to at least the indication from the card. In a more particular embodiment, the device is a switching unit having a high availability backplane environment.

The present invention provide a number of important technical advantages over prior techniques for detecting and responding to a timing error, loss of synchronization, or other clock failures, particularly within a high availability backplane environment. The present invention provides multiple layers of fault protection, including detecting a clock failure, readily identifying its source, and responding to the failure to minimize its impact on the system. In one embodiment, these operations are accomplished quickly and autonomously. Also unlike some prior techniques, the present invention does not require a hard switchover to a redundant reference clock signal, reducing the likelihood of slips in the network, lost calls, or other undesirable losses of data integrity. Nor does the present invention require that a single secondary reference signal be available and acceptable to avoid such losses of data integrity. The present invention helps prevent single points of failure from propagating within the system, thereby helping to reduce down time and to satisfy high availability and other requirements. As a result of these and other important technical advantages, the present invention is particularly suited for incorporation in a variety of switching and other modern telecommunications devices having high availability backplane environments.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
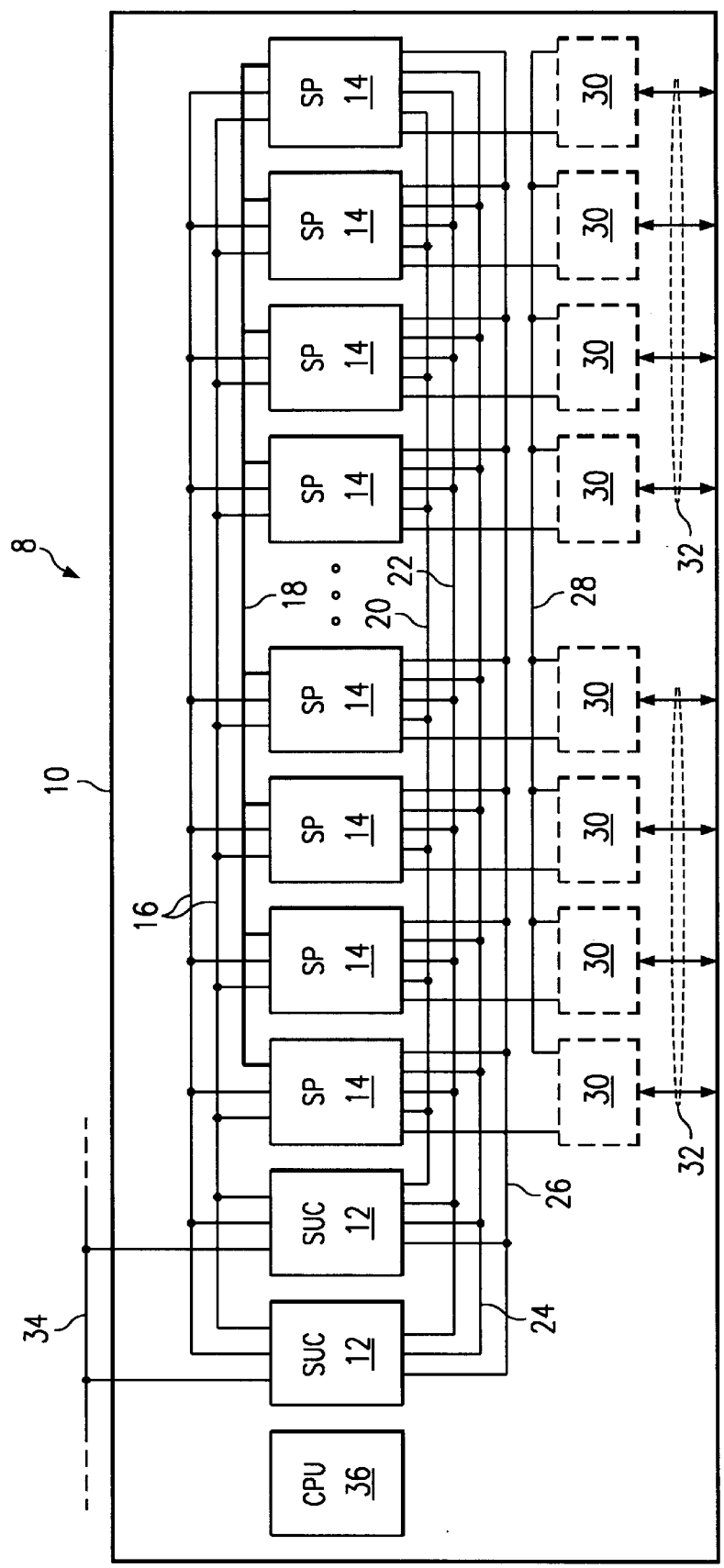
FIG. 1 illustrates an exemplary system including at least one switching unit having a redundant synchronization bus according to the present invention.

FIG. 1 illustrates an exemplary system 8 including one or more switching units 10. In one embodiment, each switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, switching unit 10 may operate at least in part subject to control of suitable software within one or more associated host computers and may be coupled to such host computers using one or more suitable communications links. Although switching unit 10 is discussed, those skilled in the art appreciate that the present invention may apply similarly to a variety of other telecommunications devices and that the present invention encompasses all such applications.

In one embodiment, switching unit 10 includes two or more redundant switching unit controllers (SUC) 12 coupled to one another and to multiple service providers (SP) 14 using two or more redundant synchronization buses 16. Each switching unit controller 12 and each service provider 14 is a card supporting appropriate integrated circuits, buses, circuitry, and any other suitable electrical components and may be shelf-mounted, rack-mounted, or otherwise removably installed within switching unit 10 in accordance with particular needs. Switching unit controllers 12 generally cooperate to control selected aspects of the operation of service providers 14 and other components within switching unit 10. Service providers 14 communicate digital signals with one another using a backplane, midplane, or other switching fabric 18 that in a particular embodiment supports up to 16,384 time slots, corresponding to as many as 16,384 ports associated with switching unit 10.

Service providers 14 generally communicate between backplane 18 and suitable network interfaces to allow switching unit 10 to communicate information with and to switch the digital signals associated with these interfaces. Service providers 14 may communicate with network interfaces of a single or multiple types, for example and not by way of limitation, T1 interfaces, E1 interfaces, Integrated Services Digital Network (ISDN) interfaces, Signaling System 7 (SS7) interfaces, Optical Carrier level-3 (OC-3) or other optical interfaces, or any other suitable interfaces, in any suitable combination. Service providers 14 may have a peer-to-peer or any suitable hierarchical relationship. Some or all switching unit controllers 12 and service providers 14 may be hot insertable, hot pluggable, hot swappable, or otherwise readily replaceable during the operation of switching unit 10 to support high availability requirements.

In general, switching unit controllers 12 and service providers 14 use control bus 20 to communicate suitable command, control, and administrative messages during the operation of switching unit 10. Control bus 20 and its associated physical layer protocol provide a local area network that couples switching unit controllers 12 and service providers 14 within the backplane environment of switching unit 10, which may be a high availability backplane environment. Control bus 20 and its operation are described more fully in copending U.S. application Ser. No. 09/328,171 and U.S. Pat. No. 6,425,009. In addition to control bus 20, switching unit controllers 12 and service providers 14 may be coupled using a combination of power bus 22, reset bus 24, and isolation bus 26 according to particular needs. As described more fully below, a system clock signal provides a "heartbeat" or timing reference for the synchronous digital communications among switching unit controllers 12 and service providers 14 over backplane 18, control bus 20, power bus 22, reset bus 24, and isolate bus 24 within the backplane environment of switching unit 10.

Associated with service providers 14 are input/output (I/O) modules 30 that in general support incoming and outgoing communications between service providers 14 and associated network interfaces using associated links 32. Protection bus 28 couples I/O modules 30 and operates in cooperation with other components of switching unit 10 to provide protection switching and other capabilities generally desirable in preventing a single point of failure from propagating within switching unit 10 and satisfying high availability requirements. A suitable protection technique involving protection bus 28 is described more fully in copending U.S. application Ser. No. 09/327,971. One or more central processing units (CPU) 36 support suitable software and cooperate with other components of switching unit 10 to facilitate the operation of the present invention. Where appropriate, reference to CPU 36 includes reference to some or all associated software unless otherwise indicated. Furthermore, although a single CPU 36 is shown, CPU 36 may include multiple CPUs, microprocessors, or other computers distributed, in whole or in part, among some or all cards within switching unit 10.

One or more switching unit controllers 12 within a particular switching unit 10 may be coupled using network 34 to one or more switching unit controllers 12 within other switching units 10, one or more associated host computers, or one or more other network components, in any suitable combination. Network 34 may be a shared or dedicated local area network (LAN) supporting Ethernet or any other communications protocol, a suitable wide area network (WAN), or any other appropriate network. In one embodiment, network 34 supports a secure 100BaseT Ethernet link and one or more higher level protocols, for example, TCP/IP (Transmission Control Protocol/Internet Protocol), UDP/IP (User Datagram Protocol/Internet Protocol), or another appropriate protocol. A service provider 14 needing to communicate with a service provider 14 located in another switching unit 10 does so using one of its associated switching unit controllers 12 as a gateway to network 34. Switching unit controller 12 collects and buffers message packets from service provider 14, reformats the message packets as appropriate, and transmits the message packets to a switching unit controller 12 in the switching unit 10 associated with the destination service provider 14.

Figure 2:
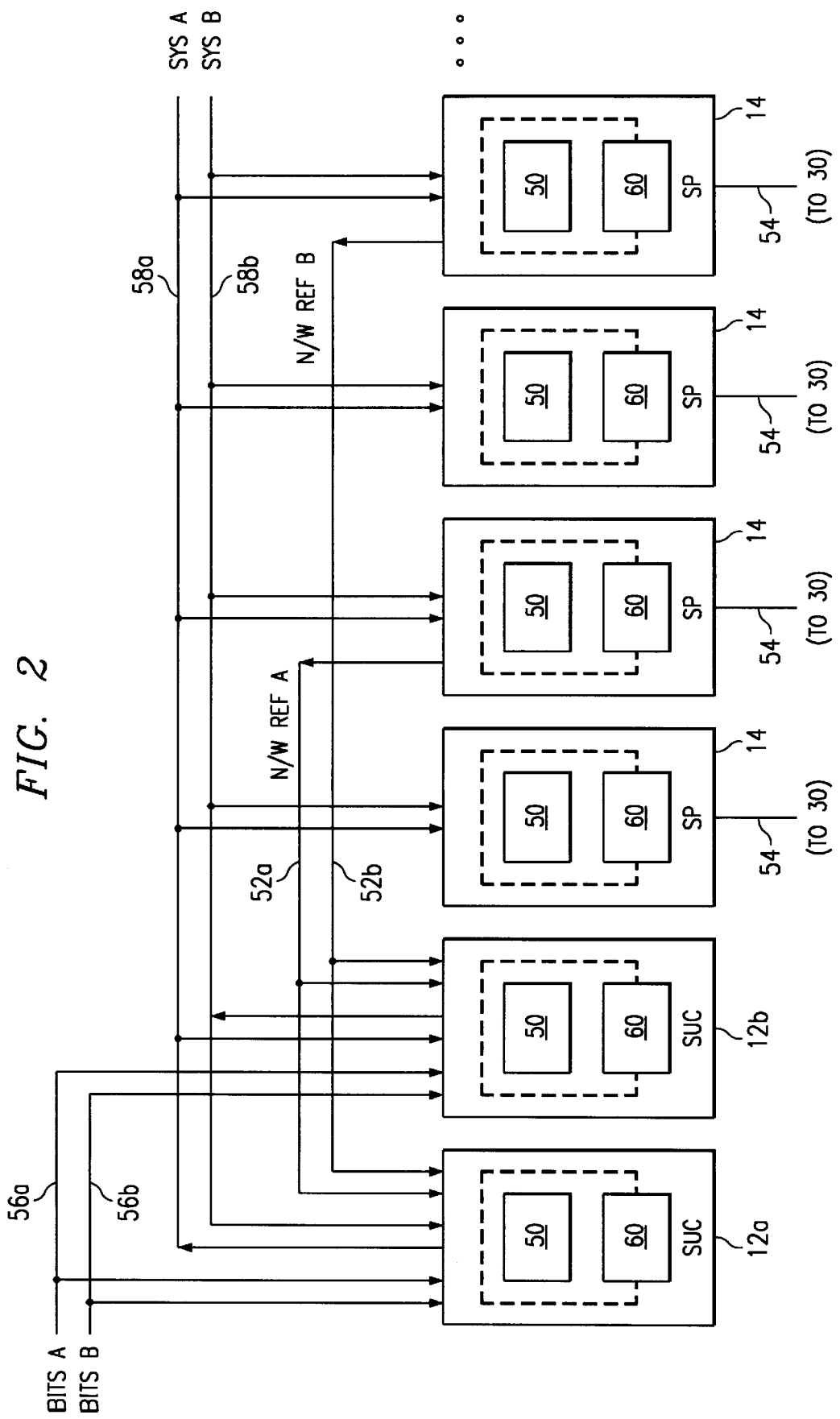
FIG. 2 illustrates exemplary clock signals and selected related components within a switching unit according to the present invention.

FIG. 2 illustrates clock signals transmitted using synchronization bus 16 between switching unit controllers 12 and service providers 14. In general, these clock signals, synchronization bus 16, and related components cooperate to provide clock synchronization between switching unit controllers 12 and service providers 14, detect and identify sources of timing errors, losses of synchronization, or other clock failures associated with switching unit controllers 12 and service providers 14, and respond to such failures to protect switching unit 10 and associated data from consequences that might otherwise result. A frame of data includes a predetermined number of time slots corresponding, in one embodiment, to a number of ports associated with switching unit 10 or an appropriate subset of that number. For example, in a particular embodiment, although the present invention contemplates any suitable frame length and any suitable number of time slots in each frame, switching unit 10 supports 16,384 ports and each 125 μs frame may include 4,096, 3,072, or 2,048 time slots according to a selected operating mode. A clock failure may result in two or more overlapping time slots, one or more shifted time slots, the misalignment of one or more time slots, or other timing error or loss of synchronization. Those skilled in the art will appreciate that the present invention encompasses all such clock failures, whether the clock failures are associated with switching unit 10 or any other telecommunications device incorporating the present invention.

In one embodiment, at least partially to support high availability requirements, switching unit controllers 12a and 12b are redundant and synchronization bus 16 is also redundant, including "A" and "B" synchronization buses 16. The present invention contemplates a single switching unit controller 12 and a single synchronization bus 16 providing some or all of the described functionality. Reference herein to a single or multiple switching unit controllers 12 is meant to include either or both switching unit controllers 12a and 12b, where appropriate. Similarly, reference herein to a single or multiple synchronization buses 16 is intended to include either or both "A" and "B" synchronization buses 16, where appropriate. Switching unit controllers 12 and service providers 14 are coupled to and communicate with one another using synchronization buses 16 and associated bus interface functionality.

Switching unit controllers 12 and service providers 14 each include a clock generator complex 50 suitable for generating or otherwise providing clock signals for communication using synchronization bus 16. All switching unit controllers 12 and service providers 14 may have functionally equivalent clock generator complexes 50 or the functionality of one or more clock generator complexes 50 may vary according to their locations and particular needs. In one embodiment, clock generator complexes 50 for service providers 14 are simplified relative to clock generator complexes 50 for switching unit controllers 12 and contain substantially reduced functionality in keeping with the differing responsibilities of these components. An exemplary clock generator complex 50 for a particular switching unit controller 12a or 12b is described more fully below with reference to FIG. 4.

In one embodiment, a first reference service provider 14 generates or otherwise provides a first network reference clock signal 52a (N/W REF A) derived according to the timing of the associated digital network. A second reference service provider 14 provides a second network reference clock signal 52b (N/W REF B), which is also derived according to the timing of the associated digital network. CPU 36 or another component of switching unit 10 selects reference service providers 14, in any suitable manner before or during operation of switching unit, from among some or all service providers 14 that are capable of providing suitable network reference clock signals 52a and 52b. Some or all service providers 14 within switching unit 10, including at least reference service providers 14, receive timing information from the network using associated I/O modules 30 and links 54, which couple service providers 14 to I/O modules 30. The timing information may be received directly in the form of a timing signal generated at another network device and communicated according to a protocol associated with the network, indirectly based on inherent timing of the digital signals received from the network, or in any other suitable manner. Reference service providers 14 manipulate the received timing information as appropriate to generate network reference clock signals 52a and 52b. Reference service providers 14 then communicate network reference clock signal 52a and 52b to switching unit controllers 12a and 12b using "A" and "B" synchronization buses 16, respectively. In one embodiment, each of the switching unit controller 12a and 12b receives both of the network reference clock signals 52a and 52b.

As discussed more fully below with reference to FIG. 4, clock generator complexes 50 of switching unit controllers 12 may each include an internal oscillator suitable for providing internal reference clock signals for use within clock generator complexes 50. Each switching unit controller 12a and 12b may also receive either or both of building integrated timing supply (BITS) reference clock signals 56a (BITS A) and 56b (BITS B), which may have any suitable sources within or external to switching unit 10. Furthermore, each switching unit controller 12a and 12b may receive a system clock signal 58b (SYS B) or 58a (SYS A) generated at the other switching unit controller 12b or 12a. Therefore, in one embodiment, clock generator complex 50 for each switching unit controller 12a and 12b receives or has access to the following clock signals, in any suitable combination and without limitation: (1) the internal reference clock signal from the internal oscillator associated with switching unit controller 12a or 12b, (2) network reference clock signals 52a and 52b from reference service providers 14, (3) BITS reference clock signals 56a and 56b, and (4) system clock signals 58b (SYS B) or 58a (SYS A) from the other switching unit controller 12b or 12a.

As discussed more fully below with reference to FIG. 4, clock generator complexes 50 of switching unit controllers 12a and 12b each selects a primary and a secondary reference clock signal from among the candidate reference clock signals set forth above. Clock generator complex 50 locks on or otherwise synchronizes with the primary reference clock signal and then generates system clock signal 58a or 58b for communication to the other switching unit controller 12b or 12a, respectively, and to service providers 14 over "A" or "B" synchronization bus 16, respectively. Although clock generator complex 50 may receive or have access to the six candidate reference clock signals described, one or more reference clock signals may be omitted or one or more additional reference clock signals may be received without departing from the intended scope of the present invention.

In one embodiment, switching unit controllers 12 and service providers 14 each include an application specific integrated circuit (ASIC) complex 60 responsible for controlling some or all operations of switching unit controller 12 or service provider 14 with respect to clock synchronization, associated error detection, and associated fault protection, among other responsibilities. ASIC complex 60 may include one or more ASIC devices each providing the same, partially overlapping, or different functionality than one or more other ASIC devices in ASIC complex 60. In a particular embodiment, ASIC complex 60 for each switching unit controller 12 supports a single ASIC device, and ASIC complex 60 for each service provider 14 supports up to five ASIC devices, depending in general on the number of ports associated with switching unit 10 and other suitable factors. Exemplary ASIC complexes 60 and ASIC devices are described. more fully in copending U.S. application Ser. No. 09/327,700. While ASIC complexes 60 are discussed, any suitable combination of hardware and software may replace or combine with one or more ASIC complexes 60 to provide clock synchronization, error detection, and fault protection within switching unit 10 according to the present invention. For example, in one embodiment, CPU 36 and its associated software may cooperate with ASIC complex 60 to facilitate operation of the present invention.

Figure 3:
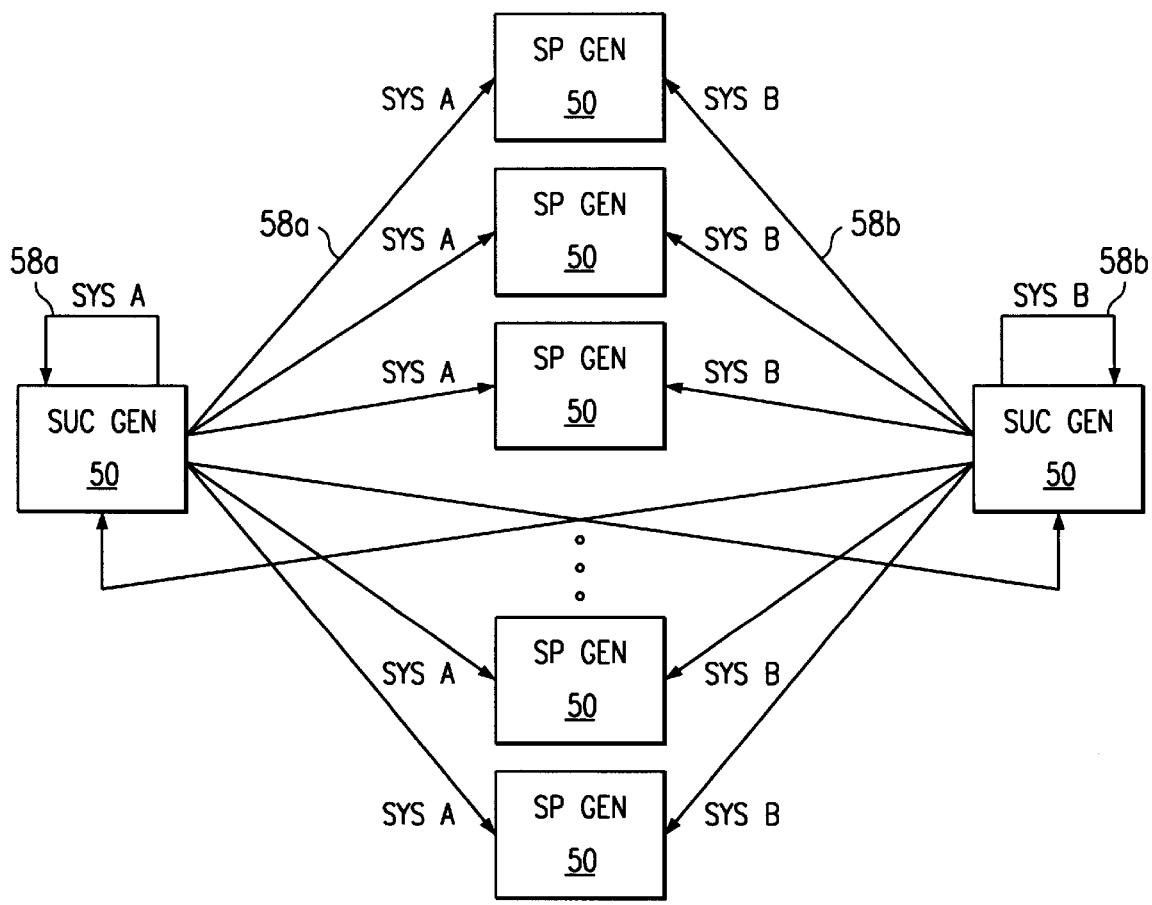
FIG. 3 illustrates exemplary distribution of system clock signals according to the present invention.

FIG. 3 illustrates an exemplary distribution of system clock signals 58a and 58b from switching unit controllers 12a and 12b, respectively, to service providers 14. In one embodiment, the physical arrangement of service providers 14 with respect to switching unit controllers 12a and 12b is such that most or all system clock signals 58a and 58b, respectively, travel substantially equal distances to service providers 14. This helps equalize trace delays and loads on system clock signals 58a and 58b, minimize clock skew between cards within switching unit 10, and minimize clock skew between integrated circuits and other suitable components on a particular card. In a particular embodiment, card to card clock skew may be less than approximately +/−0.5 ns, chip to chip clock skew on a particular card may be less than approximately +/−1.0 ns, and total clock skew within switching unit 10 may be less than approximately +/−1.5 ns. While system clock signals 58a and 58b are shown generally propagating from clock generator complexes 50 (SUC GEN) of switching unit controllers 12a and 12b, respectively, to clock generator complexes 50 (SP GEN) of service providers 14, system clock signals 58a and 58b may propagate substantially equal distances between any suitable points, according to particular needs. As shown in FIG. 3, and as described more fully below, each switching unit controller 12a and 12b may recover its own system clock signal 58a or 58b, respectively, for use in its internal operations.

Figure 4:
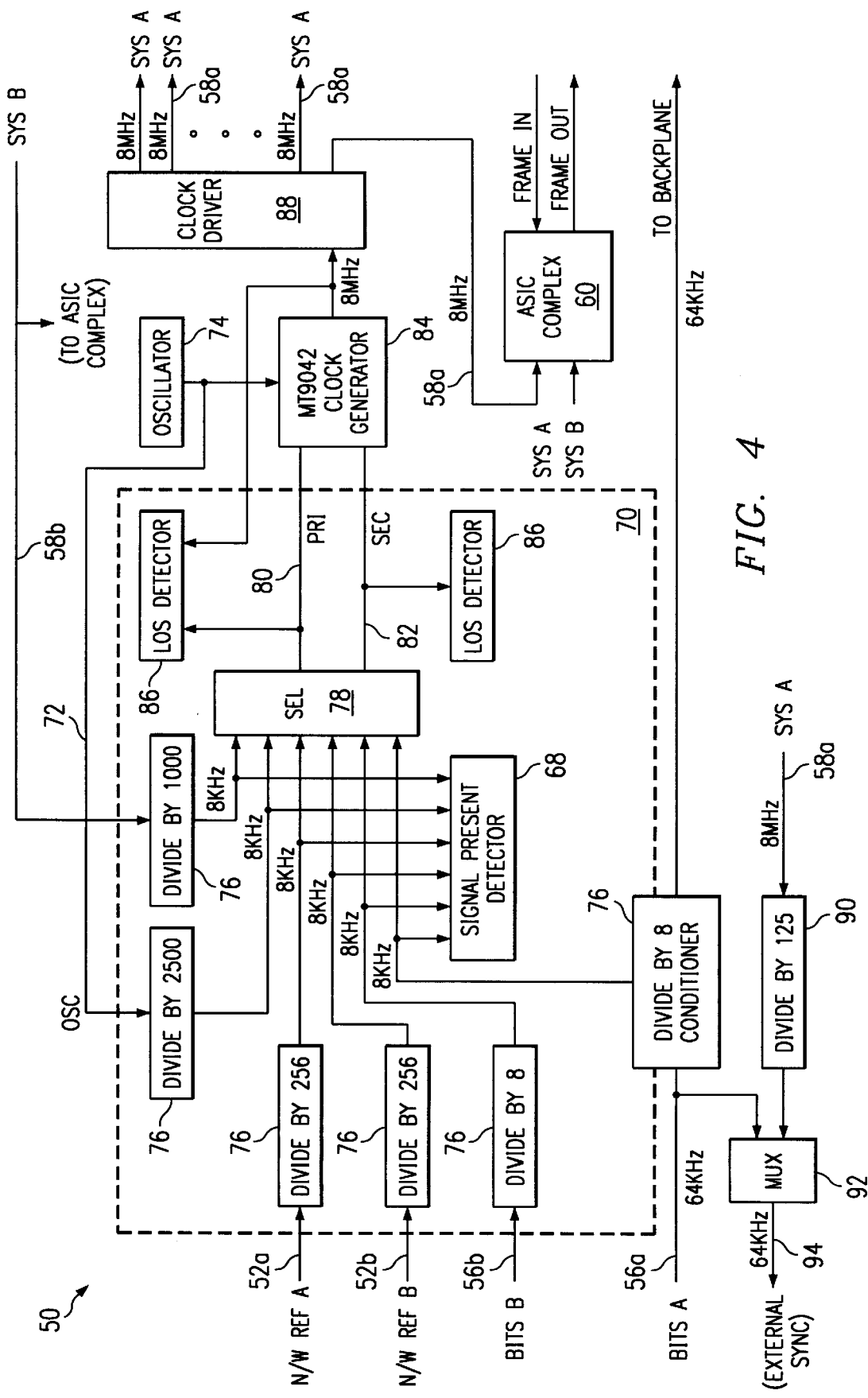
FIG. 4 illustrates an exemplary clock generation complex according to the present invention.

FIG. 4 illustrates an exemplary clock generator complex 50 for a particular switching unit controller 12a. Clock generator complex 50 includes a core 70 that as discussed above receives, in any suitable combination, without limitation: (1) internal reference clock signal (OSC) 72 from the internal oscillator 74, (2) network reference clock signals 52a and 52b from reference service providers 14, (3) BITS reference clock signals 56a and 56b, and (4) system clock signal 58b from the other switching unit controller 12b. Dividers 76 may adapt received clock signal rates as appropriate, and may provide bit conditioning and other suitable functionality, according to particular needs.

For example, in a particular embodiment, "2500" divider 76 may adapt internal reference clock signal 72 from 20 MHz to 8 kHz, "256" dividers 76 may adapt network reference clock signals 52a and 52b from 2.048 MHz to 8 kHz, "8" dividers 76 may adapt BITS reference clock signals 56a and 56b from 64 kHz to 8 kHz, and "1000" divider 76 may adapt system clock signal 58b from 8 Mhz to 8 kHz. The system clock signal 58a generated and driven out onto "A" synchronization bus 16 for communication to other switching unit controller 12b and service providers 14 has the same rate as the system clock signal 58b received from other switching unit controller 12b. While the clock signal rates and dividers 76 for a particular embodiment of the present invention are shown in FIG. 4 and discussed herein, the present invention contemplates clock signals with any suitable rates and adapting the clock signals in any suitable manner using dividers 76 or otherwise.

Core 70 includes a selector (SEL) 78 that receives some or all clock signals 72, 52a, 52b, 56a, 56b, and 58b after appropriate adaptation using dividers 76. According to pre-programmed instructions from CPU 36 or otherwise, selector 78 selects a first one of these candidate reference clock signals as primary reference clock signal (PRI) 80, selects a second one of these candidate reference clock signals as secondary reference clock signal (SEC) 82, and then transmits reference clock signals 80 and 82 to clock generator 84. Selector 78 may evaluate the "health," synchronization, or other suitable characteristics of some or all of the candidate reference clock signals before selecting reference clock signals 80 and 82. Preferably, both switching unit controllers 12a and 12b are instructed to select the same primary and secondary reference clock signals 80 and 82, respectively. Signal present detector 68 monitors all candidate reference clock signals 72, 52a, 52b, 56a, 56b, and 58b and may report as appropriate to CPU 36, ASIC complex 60, or both concerning the presence of these clock signals. Detector 68 may affirmatively report the presence of a clock signal, such that the lack of a report from detector 68 will indicate that the clock signal has disappeared, is lost, or is otherwise unavailable. Alternatively, detector 68 may report only the absence of a clock signal, such that the lack of a report will indicate that the clock signal is present. Detector 68 may operate in any suitable manner to detect and to indicate the health of the candidate reference clock signals 72, 52a, 52b, 56a, 56b, and 58b.

One or more loss of signal (LOS) detectors 86 monitor primary reference clock signal 80 and second reference clock signal 82 to detect whether one or both signals 80 and 82 have disappeared, are lost, or have otherwise become unavailable. Although detectors 86 are shown, the present invention contemplates a single detector 86 capable of monitoring both primary reference clock signal 80 and secondary reference clock signal 82. Detector 86 reports loss of the associated clock signal 80 or 82 to CPU 36. Detector 86 may report only loss of associated signal 80 or 82, such that lack of a report from detector 86 will indicate that signal 80 or 82 is present. In the alternative, detector 86 may affirmatively report the presence of associated signal 80 or 82, such that lack of a report will indicate associated signal 80 or 82 has disappeared, is lost, or has otherwise become unavailable for some reason. Detectors 86 may operate in any suitable manner to detect and indicate loss of primary reference clock signal 80 and secondary reference clock signal 82 within core 70 of clock generator complex 50.

In one embodiment, clock generator 84 is a MITEL 9042 integrated circuit device suitable to meet the Stratum 3 digital network clocking model requirements, although another suitable clock generator may be used without departing from the intended scope of the present invention. Clock generator 84 locks on or otherwise synchronizes with primary reference clock signal 80, with respect to both frequency and phase, and then generates an output clock signal synchronized with primary reference clock signal 80. Clock driver 88 receives the output clock signal and drives out system clock signal 58a on "A" synchronization bus 16 for transmission to switching unit controller 12b and service providers 14. One or both loss of signal detectors 86, or a separate detector, may monitor the health of output clock signal from clock generator 84. As described more fully below, clock generator 84 may receive internal reference signal 72 essentially directly from internal oscillator 74 for internal synchronization following a clock failure associated with primary reference clock signal 80. In addition to transmitting system clock signal 58a to service providers 14, clock driver 88 transmits system clock signal 58a to ASIC complex 60 of switching unit controller 12a, which may use either system clock signal 58a or system clock signal 58b for its own operations as described more fully below. Clock generator complex 50 may include a divider 90 and a multiplexer (MUX) 92 that use system clock signal 58a and BITS reference clock signal 56a to provide signals 94 for synchronization of one or more other suitable components within switching unit controller 12a.

In operation, before or during initialization of switching unit 10, software in or otherwise associated with switching unit 10, software running on CPU 36 for example, selects reference service providers 14 to generate or otherwise provide suitable network reference clock signals 52a and 52b derived according to the timing of the associated digital network. In one embodiment, any service provider 14 is capable of providing suitable network reference clock signals 52a or 52b, and CPU 36 selects the reference service providers 14 from among all service providers 14. Reference service providers 14 transmit both network reference clock signals 52a and 52b to each switching unit controller 12 using "A" and "B" synchronization buses 16, respectively. In addition to network reference clock signals 52a and 52b, switching unit controllers 12 each receive both BITS reference clock signals 56a and 56b from one or more sources internal or external to switching unit 10. Internal oscillators 74 of switching unit controllers 12 generate internal reference clock signals 72 and transmit the internal reference clock signals 72 to associated cores 70 within switching unit controllers 12. Also before or during initialization of switching unit 10, CPU 36 designates a particular switching unit controller 12, switching unit controller 12a for example, as the clock master and, either affirmatively or by default, designates the other switching unit controller 12, switching unit controller 12b in this example, as the clock slave for reasons described more filly below.

Within a particular switching unit controller 12, switching unit controller 12a for example, selector 78 of core 70 receives, in any combination and without limitation, internal reference clock signal 72, network clock reference clock signals 52a and 52b, BITS reference clock signals 56a and 56b, and system clock signal 58b from the other switching unit controller 12b. According to pre-programmed instructions from CPU 36 or otherwise, selector 78 selects primary and secondary reference clock signals 80 and 82, respectively, from among these candidate reference clock signals. Selector 78 then transmits reference clock signals 80 and 82 to clock generator 84, which locks on or otherwise synchronizes with at least primary reference clock signal 80 with respect to frequency and phase. Clock generator 84 reports its locked status to CPU 36 and then generates an output clock signal synchronized with primary reference clock signal 80. Clock driver 88 receives the output clock signal and drives system clock signal 58a out on "A" synchronization bus 16 for communication to the other switching unit controller 12b and to all the service providers 14. Similarly, switching unit controller 12b drives system clock signal 58b out on "B" synchronization bus 16 for communication to switching unit controller 12a and to all service providers 14. In one embodiment, as described more fully above with reference to FIG. 3, the physical arrangement of switching unit controllers 12a and 12b relative to service providers 14 is such that most or all system clock signals 58a and 58b propagate substantially equal distances from switching unit controllers 12 to service providers 14 to minimize card to card, chip to chip, and total clock skew.

ASIC complex 60 of each service provider 14 selects, according to input from CPU 36 or in any other suitable manner, system clock signal 58a or system clock signal 58b as its primary clock signal and, either affirmatively or by default, selects the other system clock signal 58b or 58a as its secondary clock signal. In one embodiment, each service provider 14 is commanded to select as its primary clock signal the same system clock signal 58a or 58b from the clock master, system clock signal 58a from switching unit controller 12a in this example. Using ASIC complex 60, service provider 14 locks on or otherwise synchronizes with its primary clock signal in both frequency and phase, recovers the primary clock signal using a phase locked loop (PLL) or any other suitable technique, and distributes the recovered primary clock signal to suitable components of service provider 14 for purposes of its internal switching operations. During operation of switching unit 10, service provider 14 monitors the health, synchronization, or any other suitable characteristics of its primary and secondary clock signals using loss of signal detection functionality associated with ASIC complex 60.

Within a particular switching unit controller 12, switching unit controller 12a for example, if detector 86 for primary reference clock signal 80 detects a loss of signal or other clock failure with respect to primary reference clock signal 80, software local to or otherwise associated with switching unit controller 12a instructs clock generator 84 to continue generating the output signal and transmitting it to clock driver 88, such that synchronization and data integrity may be maintained. Clock generator 84 may use internal reference clock signal 72 received directly from internal oscillator 74 for this purpose. Switching unit controller 12a, under the control of CPU 36, enters "holdover" mode to evaluate the stability, synchronization, validity, acceptability, or other suitable characteristics of secondary reference clock signal 82. In a particular embodiment, secondary reference clock signal 82 is evaluated according to Stratum 3 digital network clocking model requirements.

If the secondary reference clock signal 82 is deemed acceptable, CPU 36 may initiate gradual frequency and phase realignment involving clock generator 84 to synchronize the output signal from clock generator 84 with secondary reference clock signal 82. After appropriate synchronization has been achieved, CPU 36 initiates a switchover to secondary reference clock signal 82, designating it as the new primary reference clock signal 80, and instructs clock generator 84 to resume normal operations using new primary reference clock signal 80. CPU 36 may extend holdover mode indefinitely if no suitable secondary reference clock signal 82 can be identified. The present invention contemplates CPU 36 instructing selector 78 to select one or more different clock signals as primary and secondary reference clock signals 80 and 82, respectively, in accordance with the operations described above. For example, CPU 36 may instruct selector 78 to select two previously unselected candidate reference clock signals as new primary and secondary reference clock signals 80 and 82, respectively, where primary reference clock signal 80 is lost and secondary reference clock signal 82 is not deemed to be acceptable. Allowing switching unit controller 12a to continue its synchronous operation, despite a clock failure responsible for loss of primary reference clock signal 80 and while avoiding an undesirable hard switchover, provides important technical advantages of the present invention.

If service provider 14 detects a loss of signal or other clock failure with respect to its secondary clock signal, indicating that the clock failure is associated with either switching unit controller 12b or with the service provider 14 itself, service provider 14 reports the failure to CPU 36, to its ASIC complex 60, and to switching unit controllers 12a and 12b using control bus 20, as appropriate. Clearly, no switchover is necessary under these circumstances. Similarly, if service provider 14 detects a loss of signal or other clock failure with respect to its primary clock signal, indicating that the failure is associated with either switching unit controller 12a or with service provider 14 itself, service provider 14 reports the error condition to CPU 36, to its ASIC complex 60, and to switching unit controllers 12a and 12b, as appropriate. In this case, however, ASIC complex 60 of service provider 14 initiates a switchover to the secondary clock signal from the clock slave, system clock signal 58b in this example, such that service provider 14 may maintain substantial data integrity if switching unit controller 12a, rather than service provider 14, has experienced a failure. In one embodiment, the switchover is autonomous and is completed in less than approximately 1.0 µs, although the present invention contemplates the switchover occurring in any suitable period of time. The switchover to system clock signal 58b may be non-revertive or revertive according to particular needs.

As described below, switching unit controller 12a, switching unit controller 12b, and one or more service providers 14 will cooperate to detect a loss of signal or other clock failure, determine the source of the failure—either switching unit controller 12a, switching unit controller 12b, or a particular service provider 14—and respond to the failure in a manner that allows switching unit 10 to continue operating, substantially uninterrupted and maintaining substantial data integrity, despite the failure. Assume for purposes of the description provided below that switching unit controller 12a has been designated the clock master and that service providers 14 have therefore each selected system clock signal 58a as their primary clock signal, with system clock signal 58b from switching unit controller 12b being the secondary clock signal. In one embodiment, the cause of a loss of signal or other clock failure detected at one or more service providers 14 will fall into one of the following general categories: (1) a clock failure associated with the clock master, switching unit controller 12a; (2) a clock failure associated with the clock slave, switching unit controller 12b; or (3) a clock failure associated with a particular service provider 14.

In the first possible case, where system clock signal 58a is the primary clock signal, a clock failure associated with switching unit controller 12a is responsible for service provider 14 detecting the loss of signal with respect to system clock signal 58a. Since each service provider 14, in addition to switching unit controller 12b, monitors system clock signal 58a, each service provider 14 detects the clock failure substantially simultaneously. Each service provider 14 informs CPU 36, its ASIC complex 60, and switching unit controllers 12a and 12b of the clock failure with respect to system clock signal 58a. CPU 36 may inform switching unit controllers 12a and 12b in lieu of service providers 14 informing switching unit controllers 12a and 12b. Although the service provider 14 may be unable to independently determine whether its detection of the clock failure is associated with a clock failure of switching unit controller 12a or a failure of service provider 14 itself, both switching unit controllers 12a and 12b are aware that multiple service providers 14 have reported a clock failure. As a result, whether or not switching unit controller 12b detects the clock failure with respect to system clock signal 58a as a result of its own monitoring, which it likely will, switching unit controller 12b readily determines that the clock failure is associated with switching unit controller 12a rather than any particular service provider 14.

In one embodiment, switching unit controller 12b reports the failure to CPU 36. If switching unit controller 12a has not totally failed, it may be aware of its failure as a result of multiple error messages from service providers 14, independent of CPU 36 informing switching unit controller 12a that it has failed. Under the control of CPU 36 and associated software, failed switching unit controller 12a is removed, disconnected, or otherwise electrically isolated from the other switching unit controller 12b, service providers 14, and any other suitable components of switching unit 10 until it can be replaced, repaired, or otherwise returned to service. At least some suitable isolation techniques involving isolation bus 26 is described in copending U.S. Pat. No. 6,434, 703. As discussed above, service providers 14 each initiate an autonomous switchover to system clock signal 58b and maintain internal clock synchronization and data integrity. In addition, where system clock signal 58a has been selected as primary reference clock signal 80 for switching unit controller 12b, switching unit controller 12b may enter holdover mode and eventually switchover to its secondary reference clock signal 82. According to the present invention, a clock failure associated with switching unit controller 12a is autonomously detected, its source readily identified, and responded to with little or no interruption to internal operations of switching unit 10, providing an important technical advantage over previous techniques.

In the second possible case, if system clock signal 58b is the secondary clock signal, a clock failure associated with switching unit controller 12b is responsible for service provider 14 detecting the loss of signal with respect to system clock signal 58b. Since each service provider 14, in addition to switching unit controller 12a, monitors system clock signal 58b, each service provider 14 detects the clock failure substantially simultaneously. Each service provider 14 informs CPU 36, its ASIC complex 60, and switching unit controllers 12a and 12b of the clock failure with respect to system clock signal 58b. CPU 36 may inform switching unit controllers 12a and 12b in lieu of service providers 14 informing switching unit controllers 12a and 12b. Although the service provider 14 may be unable to independently determine whether its detection of the clock failure is associated with a clock failure of switching unit controller 12b or a failure of service provider 14 itself, both switching unit controllers 12a and 12b are aware that multiple service providers 14 have reported a clock failure. As a result, whether or not switching unit controller 12a detects a clock failure with respect to system clock signal 58b as a result of its own monitoring, which it likely will, switching unit controller 12a readily determines that the clock failure is associated with switching unit controller 12b rather than any particular service provider 14.

In one embodiment, switching unit controller 12a reports the failure to CPU 36. If switching unit controller 12b has not totally failed, it may be aware of its failure as a result of multiple error messages from service providers 14, independent of CPU 36 informing switching unit controller 12b that it has failed. Under the control of CPU 36 and associated software, failed switching unit controller 12b is removed, disconnected, or otherwise electrically isolated from the other switching unit controller 12a, service providers 14, and any other suitable components of switching unit 10 until it can be replaced, repaired, or otherwise returned to service. Unlike in the first case discussed above, service providers 14 need not and therefore will not initiate a switchover. If system clock signal 58b is selected as primary reference clock signal 80 for switching unit controller 12a, however, switching unit controller 12a may need to enter holdover mode and eventually switchover to its secondary reference clock signal 82. According to the present invention, a clock failure associated with switching unit controller 12b is autonomously detected, its source readily identified, and responded to with little or no interruption to the internal operations of switching unit 10, providing an important technical advantage over previous techniques.

In the third possible case, a clock failure detected with respect to system clock signal 58a or 58b is associated with a failure of service provider 14. Taking detection of a loss of signal with respect to system clock 58a from the clock master as the case of most interest, service provider 14 detects the loss of signal, initiates an autonomous switchover to system clock signal 58b, and reports the error to CPU 36, ASIC complex 60, and switching unit controllers 12a and 12b. Service provider 14 may independently recognize it has failed and, under software control or otherwise, remove, disconnect, or electrically isolate itself from switching unit controllers 12 and other service providers 14. Although service provider 14 may not be able to independently determine whether a failure is associated with service provide 14 itself or with the source of system clock signal 58a—switching unit controller 12a—due to a total failure of service provider 14 or for any other reason, both switching unit controllers 12a and 12b readily identify service provider 14 as having failed since neither becomes aware of multiple service providers 14 having reported a clock failure. As for failure of switching unit controller 12a or 12b described above, failure of service provider 14 is autonomously detected, its source identified, and handled without allowing the single point of failure to propagate and thereby interrupt operation of other components within switching unit 10.

The present invention allows the source of a loss of signal or other clock failure to be readily identified according to "two out of three voting" between switching unit controller 12a, switching unit controller 12b, and one or more service providers 14. If switching unit controller 12b and multiple service providers 14 detect a loss of signal associated with system clock signal 58a, then the clock failure is likely associated with the source of system clock signal 58a—switching unit controller 12a. Similarly, if switching unit controller 12a and multiple service providers 14 detect a loss of signal associated with system clock signal 58b, then the clock failure is probably associated with the source of system clock signal 58b—switching unit controller 12b. Finally, if only a single service provider 14 detects a loss of signal associated with system clock signal 58a or 58b, then the error is probably associated with service provider 14 itself. The present invention provides a number of important technical advantages over prior techniques that do not identify the source of the failure, require an undesirable "hard" switchover to a redundant reference clock signal, and require expensive components to reduce the effects of such a switchover. Prior techniques are therefore inadequate for incorporation within high availability backplane environments of switching and other telecommunications devices.

Figure 5A:
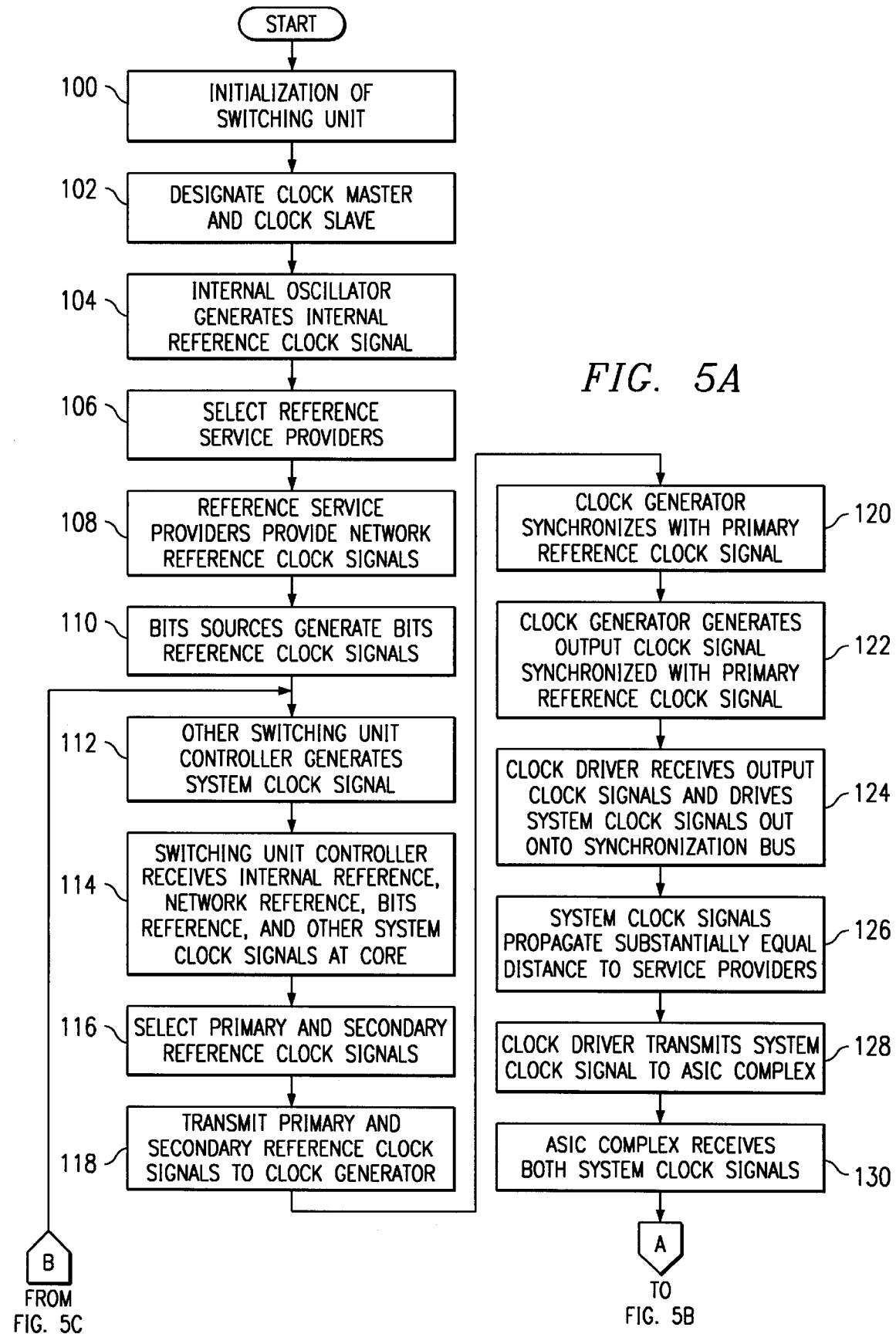
FIGS. 5A–5C are a flow chart that illustrates an exemplary method of providing clock synchronization and associated fault protection for a switching unit controller according to the present invention.
Figure 5B:
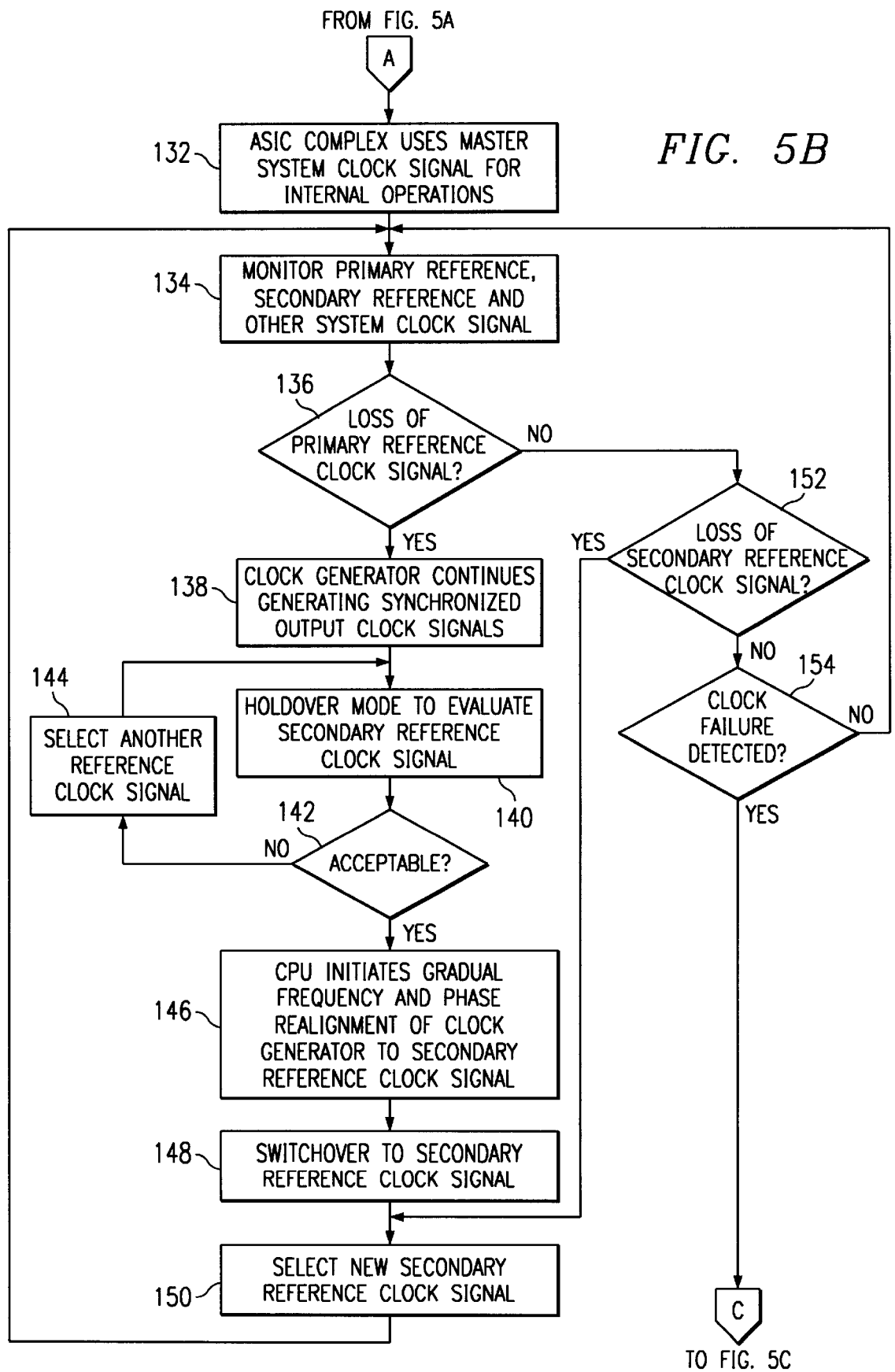
Figure 5C:
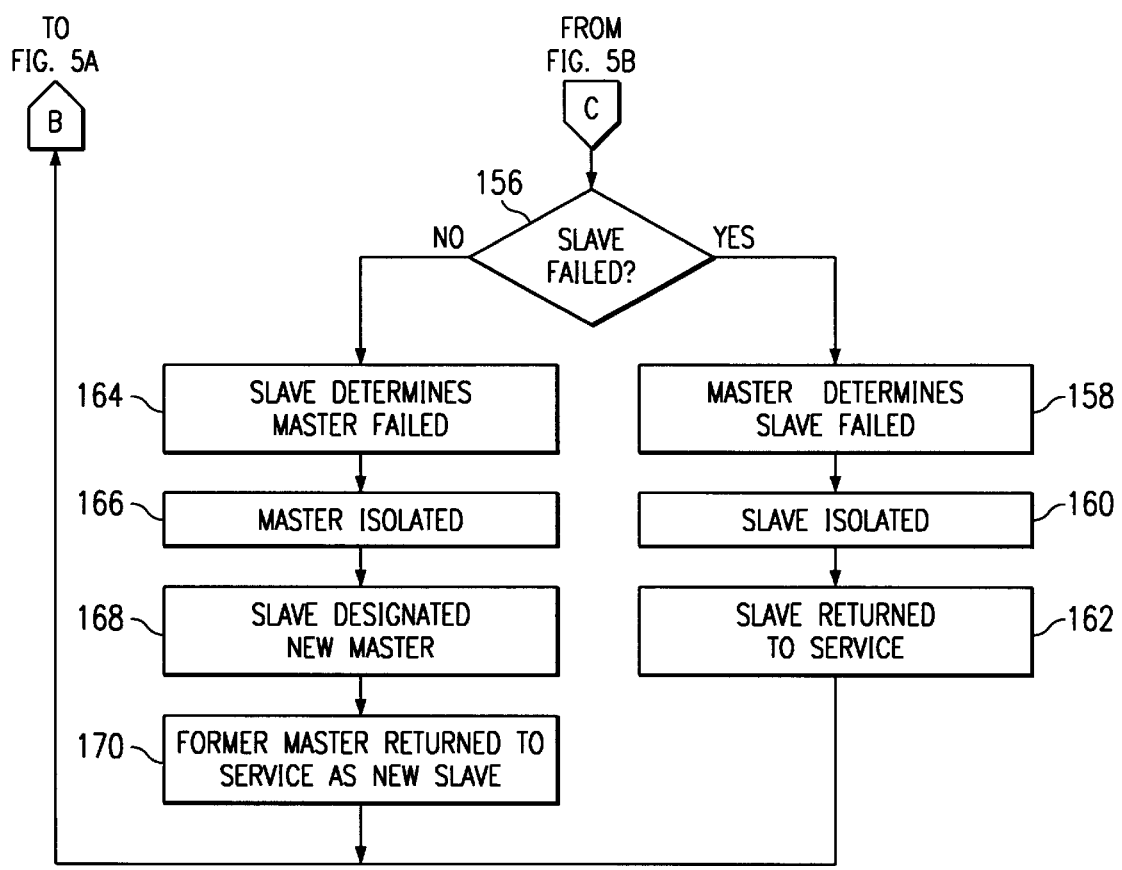

FIGS. 5A–5C are a flow chart that illustrates an exemplary method of providing clock synchronization and associated fault protection for a switching unit controller 12, switching unit controller 12a in this example, according to the present invention. The method begins at step 100, where switching unit 10 initializes. Before or during initialization of switching unit 10, at step 102, CPU 36 designates a particular switching unit controller 12, switching unit controller 12a in this particular example, as the clock master and designates the other switching unit controller 12, switching unit controller 12b in this example, as the clock slave. At step 104, internal oscillator 74 of switching unit controller 12a begins generating internal reference clock signal 72 and transmitting internal reference clock signal 72 to associated core 70. At step 106, CPU 36 selects reference service providers 14 to generate or otherwise provide, at step 108, network reference clock signals 52a and 52b derived according to the timing of the associated digital network. At step 110, BITS sources internal or external to switching unit 10 generate BITS reference clock signals 56a and 56b for transmission to core 70 of switching unit controller 12a, and at step 112, the other switching unit controller 12b generates system clock signal 58b for transmission to switching unit controller 12a over "B" synchronization bus 16. Steps 102 through 112 may occur serially, substantially simultaneously, or in any other appropriate order.

At step 114, switching unit controller 12a receives at selector 78, in any suitable combination and without limitation, internal reference clock signal 72, network clock reference clock signals 52a and 52b, BITS reference clock signals 56a and 56b, and system clock signal 58b from the other switching unit controller 12b. According to preprogrammed instructions from CPU 36 or otherwise, selector 78 selects primary and secondary reference clock signals 80 and 82, respectively, at step 116 from among the candidate reference clock signals. Selector 78 transmits reference clock signals 80 and 82 to clock generator 84 at step 118, which locks on or otherwise synchronizes with at least primary reference clock signal 80 at step 120 with respect to both frequency and phase. Clock generator 84 reports its locked status to CPU 36 and, at step 122, generates an output clock signal synchronized with the primary reference clock signal 80. Clock driver 88 receives the output clock signal and drives out system clock signal 58a onto "A" synchronization bus 16 at step 124 for communication to other switching unit controller 12b and to all service providers 14. In one embodiment, as described more fully above with reference to FIG. 3, physical arrangement of switching unit controllers 12a relative to service providers 14 is such that most or all system clock signals 58a are propagated substantially equal distances from switching unit controller 12a to service providers 14 at step 126 to minimize card to card, chip to chip, and total clock skew in switching unit 10.

Clock driver 88 also transmits system clock signal 58a to ASIC complex 60 at step 128. ASIC complex 60 receives both system clock signals 58a and 58b at step 130 and, according to the designation of the clock master, uses system clock signal 58a for its internal operations at step 132. At step 134, switching unit controller 12a monitors primary reference clock signal 80, secondary reference clock signal 82, and also system clock signal 58b from switching unit controller 12b. If detector 86 indicates a loss of primary reference clock signal 80 at step 136, clock generator 84 at the command of software continues generating a synchronized output signal and transmitting it to clock driver 88 at step 138, such that substantial data integrity may be maintained. Clock generator 84 may use internal reference clock signal 72 received directly from internal oscillator 74 for this purpose. Switching unit controller 12a, under the control of CPU 36, enters "holdover" mode at step 140 to evaluate the acceptability of the secondary reference clock signal 82.

If secondary reference clock signal 82 is not deemed acceptable at step 142, another reference clock signal is selected at step 144 and evaluated at step 140. CPU 36 may extend the holdover mode more or less indefinitely, the method looping until an acceptable secondary reference clock signal 82 is identified at step 142. If secondary reference clock signal 82 is acceptable at step 142, CPU 36 initiates gradual frequency and phase realignment of clock generator 84 at step 146 to synchronize the output signal from clock generator 84 with secondary reference clock signal 82. After suitable synchronization has been achieved, CPU 36 initiates a switchover to the secondary reference clock signal 82 at step 148, designating it as the new primary reference clock signal 80, and instructs clock generator 84 to resume normal operations using new primary reference clock signal 80. A new secondary reference clock signal 82 is selected at step 150, and the method returns to step 134 for further monitoring of new primary reference clock signal 80, new secondary reference clock signal 82, and system clock signal 58b from other switching unit controller 12b. If there has been no loss of primary reference clock signal 80 at step 136, but detector 86 indicates loss of the secondary reference clock signal 82 at step 152, a switchover is unnecessary. The method proceeds directly to step 150, where a new secondary reference clock signal 82 is selected before the method returns to step 134 for further monitoring.

If there has been no loss of the primary reference clock signal 80 at step 136 and no loss of the secondary reference clock signal 82 at step 152, and none of the service providers 14 have detected a clock failure at step 154, the method returns to step 134 for continued monitoring. However, if one or more service providers 14 have detected a clock failure at step 154, the clock master, the clock slave, or a single service provider 14 has experienced a failure. If the clock slave, switching unit controller 12b in this example, has failed at step 156, the clock master, switching unit controller 12a in this example, readily determines the slave has failed at step 158. In one embodiment, the master determines failure of the slave based in part on its own monitoring of system clock signal 58b and based in part on multiple service providers 14 reporting loss of system clock signal 58b. Under software control or otherwise, the slave is removed, disconnected, or otherwise electrically isolated from switching unit controller 12a and service providers 14 at step 160 until it can be replaced, repaired, or otherwise returned to service at step 162. When the slave is returned to service, the method returns to step 112, where the slave begins generating system clock signal 58b once more.

If one or more service providers 14 have detected a clock failure at step 154, but the clock slave has not failed at step 156, the clock master has failed and the clock slave readily determines the failure of the master at step 164. In one embodiment, the slave determines failure of the master based in part on its own monitoring of system clock signal 58a and based in part on multiple service providers 14 reporting loss of system clock signal 58a. Under software control or otherwise, the master is then removed, disconnected, or otherwise electrically isolated from the slave and service providers 14 at step 166 and CPU 36 designates the slave as the new master at step 168. After switching unit controller 12a has been replaced, repaired, or returned to service at step 170, the method returns to step 112, where switching unit controller 12a again receives a suitable combination of internal reference clock signal 72, network reference clock signals 52a and 52b, BITS reference clock signals 56a and 56b, and system clock signal 58b from the other switching unit controller 12b. The present invention contemplates reverting to selection of switching unit controller 12a as master, rather than as slave, following switching unit controller 12a returning to service at step 170. The method continues in this manner while switching unit 10 remains in operation, providing clock synchronization and fault protection according to the present invention.

Figure 6A:
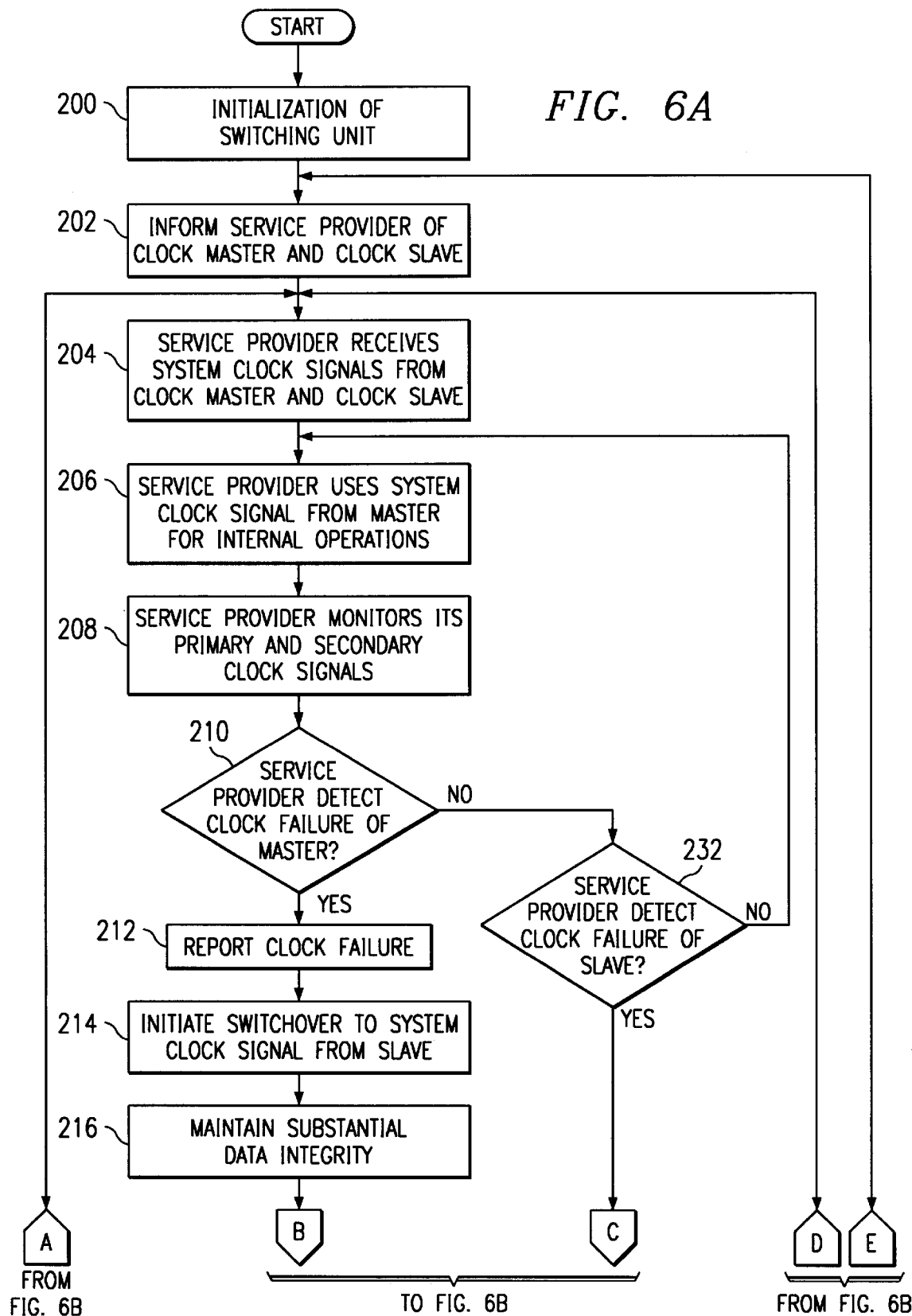
FIGS. 6A and 6B are a flow chart that illustrates an exemplary method of providing clock synchronization and associated fault protection for a service provider according to the present invention.
Figure 6B:
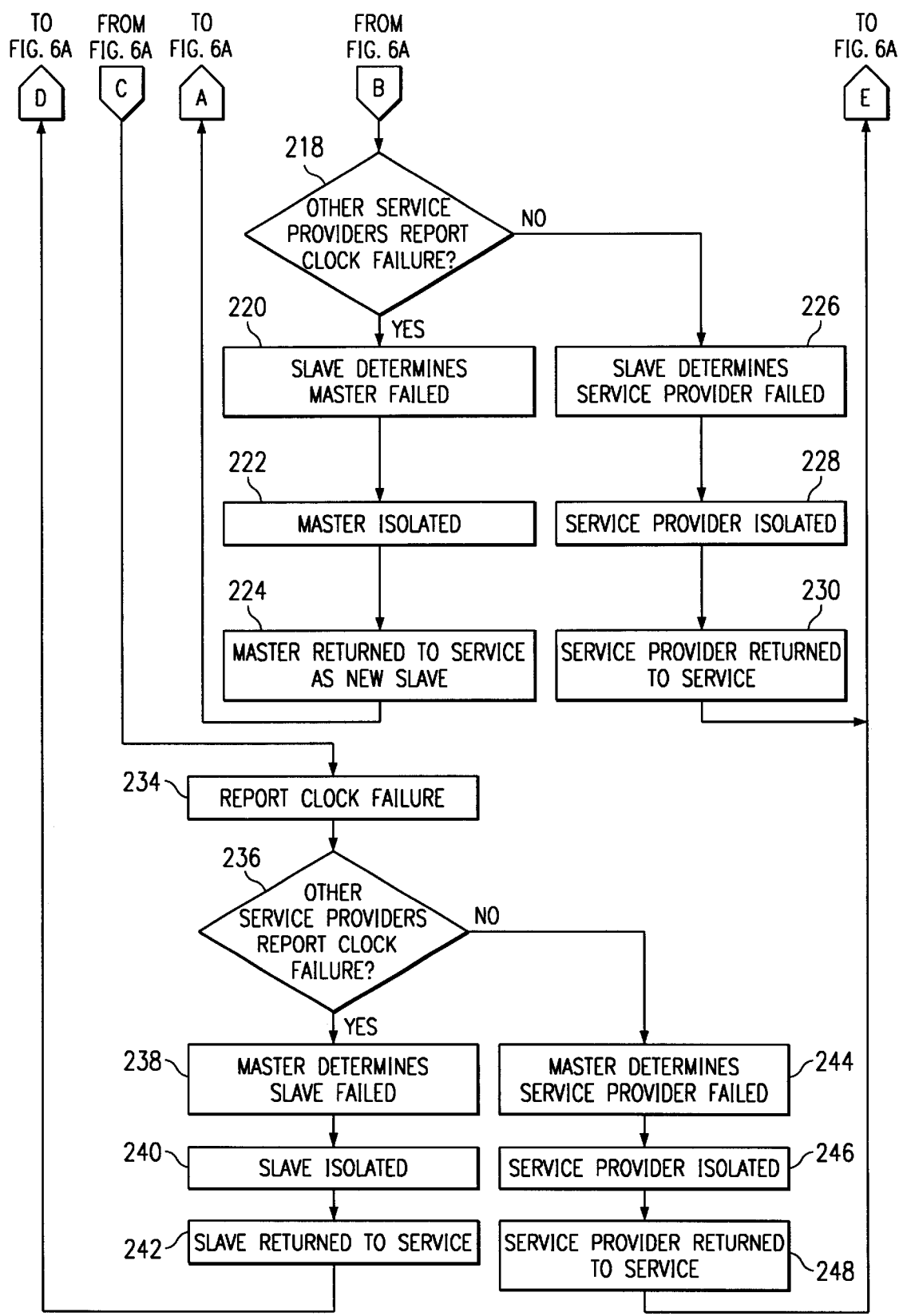

FIGS. 6A and 6B are a flow chart that illustrates an exemplary method of providing clock synchronization and associated fault protection for a particular service provider 14 according to the present invention. The method begins at step 200, where switching unit 10 initializes. Before or during initialization of switching unit 10, at step 202, CPU 36 informs service provider 14 that, in this example, switching unit controller 12a is the clock master and, directly or by default, switching unit controller 12b is the clock slave. ASIC complex 60 of service provider 14 receives both system clock signals 58a and 58b at step 204 and, according to the designation of the clock master and thus system clock signal 58a as the primary clock signal, uses system clock signal 58a for its internal operations at step 206. Using ASIC complex 60, service provider 14 locks on or otherwise synchronizes with its primary clock signal in both frequency and phase, recovers the primary clock signal, and distributes the recovered primary clock signal to suitable components of service provider 14 for internal switching operations. Service provider 14 monitors the health, synchronization, or any other suitable characteristics of its primary and secondary clock signals at step 208 using functionality associated with ASIC complex 60.

At step 210, if service provider 14 detects a loss of system clock signal 58a from the master, which is switching unit controller 12a in this example, service provider 14 reports the failure to CPU 36, ASIC complex 60, and switching unit controllers 12a and 12b, as appropriate, at step 212. At step 214, ASIC complex 60 of service provider 14 initiates a switchover to the secondary clock signal from the clock slave, system clock signal 58b from switching unit controller 12b in this example, such that service provider 14 may maintain substantial data integrity at step 216 if switching unit controller 12a, rather than service provider 14, has failed. In one embodiment, as discussed above, the switchover is autonomous and occurs in less than approximately 1.0 μs. If one or more other service providers 14 have also reported the clock failure at step 218, the slave readily determines the failure at step 220. In one embodiment, the slave determines failure of the master based in part on its own monitoring of system clock signal 58a and based in part on multiple service providers 14 reporting the loss of system clock signal 58a. Under software control or otherwise, the master is then removed, disconnected, or otherwise electrically isolated from the slave and service providers 14 at step 222 until the master can be replaced, repaired, or otherwise returned to service at step 224, when the method returns to step 204.

If no other service providers 14 have also reported the failure at step 218, the slave readily determines that service provider 14 has itself failed at step 226. In one embodiment, the slave determines failure of service provider 14 based in part upon its own monitoring of system clock signal 58a and based in part upon some or all other service providers 14 not reporting loss of system clock signal 58a. Under the control of software or otherwise, service provider 14 is then removed, disconnected, or otherwise electrically isolated from master, slave, and other service providers 14 at step 228 until service provider 14 can be suitably returned to service at step 230, when the method returns to step 202.

If service provider 14 does not detect a clock failure with respect to the master at step 210, but detects a loss of signal or other clock failure with respect to its secondary clock signal, system clock signal 58b, at step 232, it indicates that the clock failure is associated with either switching unit controller 12b or with the service provider 14 itself. At step 234, service provider 14 reports the failure to CPU 36, to its ASIC complex 60, and to switching unit controllers 12a and 12b using control bus 20, as appropriate. No switchover is necessary under these circumstances. If other service providers 14 have reported the failure at step 236, the master readily determines failure of the slave at step 238. In one embodiment, the master determines failure of the slave based in part upon its own monitoring of system clock signal 58b and based in part upon multiple service providers 14 reporting loss of system clock signal 58b. At step 240, under software control or otherwise, the slave is then removed, disconnected, or otherwise electrically isolated from the master and from service providers 14 until the slave, switching unit controller 12b in this particular example, is replaced, repaired, or otherwise returned to service at step 242, when the method returns to step 204.

If some or all other service providers 14 have not detected and reported to CPU 36 on the clock failure at step 236, the master readily determines that service provider 14 has failed at step 244 and service provider 14 is isolated from switching unit controllers 12a and 12b and from other service providers 14 at step 246. In one embodiment, the master determines the failure of service provider 14 based in part on its own monitoring of system clock signal 58b and in part on some or all other service providers 14 not reporting loss of system clock signal 58b. After the service provider 14 is replaced, repaired, or otherwise returned to service at step 248, the method returns to step 202. Since the method continues in this manner while switching unit 10 is in operation, the operation of switching unit 10 is protected from clock failures associated with switching unit controllers 12a and 12b, and is also protected from a failure of one or more service providers 14, helping to prevent a single point of failure from propagating and to satisfy high availability requirements.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunications device, comprising:
    a synchronization bus;
    a first controller coupled to the bus and operable to select a primary reference clock signal from a plurality of reference clock signals, the first controller operable to generate a first system clock signal according to the primary reference clock signal and to communicate the system clock signal using the bus; and
    wherein the first controller is operable to detect a loss of signal associated with the primary reference clock signal and, in response:
        to enter holdover mode;
        to continue generating the first system clock signal while in holdover mode;
        to determine acceptability of a secondary reference clock signal also selected from the plurality of reference clock signals;
        to switchover from the primary reference clock signal to the secondary reference clock signal if the secondary reference clock signal is acceptable; and
        in response to the switchover, to generate the first system clock signal according to the secondary reference clock signal.

2. The device of claim 1, wherein the device is a switching unit having a high availability backplane environment.

3. The device of claim 1, wherein the plurality of reference clock signals comprises:
    at least one internal reference clock signal generated using an oscillator internal to the first controller;
    at least one network reference clock signal generated according to the timing of an associated digital network,
    at least one BITS clock signal; and
    a second system clock signal received from a second controller.

4. The device of claim 1, wherein the device is further operable, in response to detecting the loss of signal, to:
    determine acceptability of an alternative secondary reference clock signal also selected from the plurality of reference clock signals if the secondary reference clock signal is not acceptable,
    switchover from the primary reference clock signal to the alternative secondary reference clock signal if the alternative secondary reference clock signal is acceptable; and
    in response to switchover to the alternative secondary reference clock signal, generate the first system clock signal according to the alternative secondary reference clock signal.

5. The device of claim 1, wherein the switchover occurs autonomously in less than approximately one half millisecond.

6. The device of claim 1, further comprising a second controller coupled to the bus and operable to select the primary reference clock signal from the plurality of reference clock signals, the second controller operable to generate a second system clock signal according to the primary reference clock signal and to communicate the second system clock signal using the bus; and
wherein the second controller is operable to detect a loss of signal associated with the primary reference clock signal and, in response:
to enter holdover mode;
to continue generating the second system clock signal while in holdover mode;
to determine the acceptability of the secondary reference clock signal,
to switchover from the primary reference clock signal to the secondary reference clock signal if the secondary reference clock signal is acceptable; and
in response to the switchover, to generate the second system clock signal according to the secondary reference clock signal.

7. The device of claim 1, further comprising a plurality of cards coupled to the bus and each operable to receive the first system clock signal, the first system clock signal traveling substantially equal distances between the first controller and each of the cards.

8. The device of claim 7, wherein total clock skew between any two of the plurality of cards is less than approximately 1.5 nanoseconds.

9. The device of claim 1, wherein the first controller further comprises an ASIC complex operable to receive the first system clock signal and to receive a second system clock signal from a second controller, the ASIC complex using a selected one of the first and second system clock signals for operations of the ASIC complex.

10. The device of claim 1, further comprising
a second controller coupled to the bus and operable to generate a second system clock signal for communication using the bus;
a card coupled to the bus and operable to receive the first and second system clock signals, the card operable to detect a loss of signal associated with the first system clock signal and to indicate the loss of signal, the second controller operable to determine a failure of the first controller in response to at least the indication from the card.

11. The device of claim 10, wherein the second controller is further operable to detect the loss of signal and to determine the failure of the first controller in response to detecting the loss of signal and in response to the indication from the card.

12. The device of claim 10, wherein the second controller is further operable to determine a failure of the card rather than the failure of the first controller in response to at least the indication from the card if the second controller does not detect the loss of signal.

13. The device of claim 10, wherein the card is further operable to continue operating substantially uninterrupted despite the failure of the first controller.

14. A controller for operation in a telecommunications device, wherein:
the controller is coupled to a synchronization bus of the device;
the controller has access to a plurality of reference clock signals and is operable to select a primary reference clock signal from the plurality of reference clock signals, to generate a first system clock signal according to the primary reference clock signal, and to communicate the system clock signal using the bus; and
the controller is operable to detect a loss of signal associated with the primary reference clock signal and, in response:
to enter holdover mode;
to continue generating the first system clock signal while in holdover mode;
to determine acceptability of a secondary reference clock signal also selected from the plurality of reference clock signals;
to switchover from the primary reference clock signal to the secondary reference clock signal if the secondary reference clock signal is acceptable; and
in response to the switchover, to generate the first system clock signal according to the secondary reference clock signal.

15. The controller of claim 14, wherein the device is a switching unit having a high availability backplane environment.

16. The controller of claim 14, wherein the plurality of reference clock signals comprises:
at least one internal reference clock signal generated using an oscillator internal to the controller;
at least one network reference clock signal generated according to the timing of an associated digital network;
at least one BITS clock signal; and
a second system clock signal received from a second controller.

17. The controller of claim 14, wherein the controller is further operable, in response to detecting the loss of signal, to:
determine acceptability of an alternative secondary reference clock signal also selected from the plurality of reference clock signals if the secondary reference clock signal is not acceptable;
switchover from the primary reference clock signal to the alternative secondary reference clock signal if the alternative secondary reference clock signal is acceptable; and
in response to switchover to the alternative secondary reference clock signal, generate the first system clock signal according to the alternative secondary reference clock signal.

18. The controller of claim 14, wherein the switchover is autonomous and occurs in less than approximately one half millisecond.

19. The controller of claim 14, wherein the device comprises a plurality of cards coupled to the bus and each operable to receive the first system clock signal, the first system clock signal traveling substantially equal distances between the controller and each of the cards.

20. The controller of claim 14, further comprising an ASIC complex operable to receive the first system clock signal and to receive a second system clock signal from a second controller, the ASIC complex using a selected one of the first and second system clock signals for operations of the ASIC complex.

21. A telecommunications device, comprising:
a synchronization bus,
a first controller coupled to the bus, the first controller operable to generate a first system clock signal and to communicate the first system clock signal using the bus;

a second controller coupled to the bus, the second controller operable to generate a second system clock signal and to communicate the second system clock signal using the bus; and a card coupled to the bus and operable to receive the first and second system clock signals and to synchronize with at least the first system clock signal, the card operable to detect a loss of signal associated with the first system clock signal and to indicate this loss of signal, the second controller operable to determine a failure of the first controller in response to at least the indication from the card.

22. The device of claim 21, wherein the device is a switching unit having a high availability backplane environment.

23. The device of claim 21, wherein the second controller is further operable to detect the loss of signal associated with the first system clock signal, the second controller operable to determine the failure of the first controller in response to this detection in addition to the indication from the card.

24. The device of claim 21, wherein the card is further operable to detect a loss of signal associated with the second system clock signal and to indicate this loss of signal, the first controller being operable to determine a failure of the second controller in response to at least the indication from the card.

25. The device of claim 21, wherein the second controller is further operable to determine a failure of the card rather than a failure of the first controller in response to at least the indication from the card.

26. The device of claim 25, wherein the second controller determines the failure of the card only if the second controller does not itself detect the loss of signal associated with the first system clock signal.

27. The device of claim 21, further comprising at least a second card coupled to the bus and operable to receive the first and second system clock signals, the second card operable to synchronize with at least the first system clock signal, the second card operable to detect a loss of signal associated with the first system clock signal and to indicate this loss of signal, the second controller operable to determine the failure of the first controller in response to at least the indications from the first and second cards.

28. The device of claim 21, wherein the card is operable to switchover to the second system clock signal, to synchronize with the second system clock signal, and to continue its internal operations following the failure of the first controller.

29. A card for operation within a telecommunications device, the device comprising a synchronization bus operable to transmit a first system clock signal from a first controller and a second system clock signal from a second controller, wherein the card is:

coupled to the bus;

operable to receive the first and second system clock signals;

operable to synchronize with at least the first system clock signal;

operable to detect a loss of signal associated with the first system clock signal; and operable to generate an indication of this loss of signal for communication to the second controller, the second controller being operable to determine a failure of the first controller in response to at least the indication from the card.

30. The card of claim 29, wherein the device is a switching unit with a high availability backplane environment.

31. The card of claim 29, wherein the card is further operable to:

detect a loss of signal associated with the second system clock signal;

generate an indication of this loss of signal for communication to the first controller, the first controller being operable to determine a failure of the second controller in response to at least the indication from the card.

32. The card of claim 29, wherein the card has experienced a failure and generates the indication in response to the failure, the second controller determining a failure of the card rather than a failure of the first controller in response to at least the indication from the card.

33. The card of claim 29, wherein the card is one of a plurality of cards each coupled to the bus and operable to receive the first and second system clock signals, each of the cards operable to synchronize with at least the first system clock signal, to detect a loss of signal associated with the first system clock signal, and to indicate this loss of signal, the second controller operable to determine the failure of the first controller in response to at least the indications from the plurality of cards.

34. The card of claim 29, wherein the card is operable to switchover to the second system clock signal, to synchronize with the second system clock signal, and to continue its internal operations following the failure of the first controller.

35. A method of protecting the operation of a telecommunications device having a synchronization bus, comprising:

selecting a primary reference clock signal from a plurality of reference clock signals;

generating a first system clock signal according to the primary reference clock signal;

communicating the system clock signal using the bus;

detecting a loss of signal associated with the primary reference clock signal;

entering holdover mode in response to the loss of signal;

continuing to generate the first system clock signal while in holdover mode;

determining the acceptability of a secondary reference clock signal also selected from the plurality of reference clock signals;

initiating a switchover from the primary reference clock signal to the secondary reference clock signal if the secondary reference clock signal is acceptable; and in response to the switchover, generating the first system clock signal according to the secondary reference clock signal.

36. The method of claim 35, wherein the device is a switching unit having a high availability backplane environment.

37. The method of claim 35, wherein the plurality of reference clock signals comprises:

at least one internal reference clock signal generated using an oscillator internal to the first controller;

at least one network reference clock signal generated according to the timing of an associated digital network;

at least one BITS clock signal; and a second system clock signal received from a second controller.

38. The method of claim 35, further comprising:

determining the acceptability of an alternative secondary reference clock signal also selected from the plurality of reference clock signals if the secondary reference clock signal is not acceptable;

initiating a switchover from the primary reference clock signal to the alternative secondary reference clock signal if the alternative secondary reference clock signal is acceptable; and in response to switchover to the alternative secondary reference clock signal, generating the first system clock signal according to the alternative secondary reference clock signal.

39. The method of claim 35, where in the switchover occurs autonomously in less than approximately one half millisecond.

40. The method of claim 35, further comprising at a second controller also coupled to the bus:

selecting the primary reference clock signal from the plurality of reference clock signals;

generating a second system clock signal according to the primary reference clock signal;

communicating the second system clock signal using the bus;

detecting the loss of signal associated with the primary reference lock signal;

entering holdover mode in response to the loss of signal;

continuing to generate the second system clock signal while in holdover mode;

determining the acceptability of the secondary reference clock signal;

initiating a switchover from the primary reference clock signal to the secondary reference clock signal if the secondary reference clock signal is acceptable; and generating the second system clock signal according to the secondary reference clock signal in response to the switchover.

41. The method of claim 35, further comprising:

propagating the first system clock signal substantially equal distances to each of a plurality of cards coupled to the bus; and receiving the first system clock signal at the plurality of cards.

42. The method of claim 35, further comprising limiting total clock skew between any two of the plurality of cards to less than approximately 1.5 nanoseconds.

43. The method of claim 35, further comprising:

receiving, at an ASIC complex within a first controller, the first system clock signal from the first controller;

receiving, at the ASIC complex, a second system clock signal from a second controller; and using a selected one of the first and second system clock signals for operations of the ASIC complex.

44. The method of claim 35, further comprising:

generating a second system clock signal at a second controller;

communicating the second system clock signal using the bus;

receiving the first and second system clock signals at a card;

detecting at the card a loss of signal associated with the first system clock signal, the first clock signal being communicated from a first controller;

indicating at the card the loss of signal; and determining at the second controller a failure of the first controller in response to at least the indication from the card.

45. The method of claim 44, further comprising;

detecting at the second controller the loss of signal; and determining at the second controller the failure of the first controller in response to detecting the loss of signal and in response to the indication from the card.

46. The method of claim 44, further comprising determining at the second controller a failure of the card rather than the failure of the first controller in response to at least the indication from the card if the second controller does not itself detect the loss of signal.

47. The method of claim 44, further comprising continuing operation of the card substantially uninterrupted despite the failure of the first controller.

48. A method of protecting the operation of a telecommunications device having a synchronization bus, comprising:

generating a first system clock signal at a first controller coupled to the bus;

communicating the first system clock signal using the bus;

generating a second system clock signal at a second controller coupled to the bus;

communicating the second system clock signal using the bus;

receiving the first and second system clock signals at a card coupled to the bus;

synchronizing the card with at least the first system clock signal;

detecting a loss of signal associated with the first system clock signal at the card;

indicating this loss of signal at the card; and determining at the second controller a failure of the first controller in response to at least the indication from the card.

49. The method of claim 48, wherein the device is a switching unit having a high availability backplane environment.

50. The method of claim 48, further comprising:

detecting the loss of signal at the second controller; and determining at the second controller the failure of the first controller in response to the detection in addition to the indication from the card.

51. The method of claim 48, further comprising:

detecting a loss of signal associated with the second system clock signal at the card;

indicating this loss of signal at the card; and determining at the first controller a failure of the second controller in response to at least the indication from the card.

52. The method of claim 48, further comprising, at the second controller, determining a failure of the card rather than a failure of the first controller in response to at least the indication from the card.

53. The method of claim 52, further comprising, at the second controller, determining the failure of the card only if the second controller does not itself detect a loss of signal associated with the first system clock signal.

54. The method of claim 48, further comprising:

receiving the first and second system clock signals at a second card coupled to the bus;

synchronizing with at least the first system clock signal at the second card;

detect a loss of signal associated with the first system clock signal at the second card;

indicating this loss of signal at the second card; and determining at the second controller the failure of the first controller in response to at least the indications from the first and second cards.

55. The method of claim 48, further comprising:

initiating a switchover to the second system clock signal at the card in response to the loss of signal;

synchronizing with the second system clock signal at the card; and continuing its internal operations following the failure of the first controller.

* * * * *

UNITED STATES PATENT AND TRADEMARK OFFICE
CERTIFICATE OF CORRECTION

PATENT NO. : 6,631,483 B1
DATED : October 7, 2003
INVENTOR(S) : Brent K. Parrish It is certified that error appears in the above-identified patent and that said Letters Patent is hereby corrected as shown below:

Column 1,
Line 14, after "Ser. No." delete "09/328,032" and insert -- 09/328,038 --.

Column 18,
Line 51, after "network" delete "," and insert -- ; --.
Line 60, after "acceptable" delete "," and insert -- ; --.

Column 19,
Line 18, after "signal" delete "," and insert -- ; --.

Column 20,
Line 64, after "bus" delete "," and insert -- ; --.

Column 23,
Line 23, after "reference" delete "lock" and insert -- clock --.

Column 24,
Line 1, after "comprising" delete ";" and insert -- : --.
Line 62, delete "detect" and insert -- detecting --.

Signed and Sealed this

Eighth Day of June, 2004

JON W. DUDAS
*Acting Director of the United States Patent and Trademark Office*